July 28, 1970

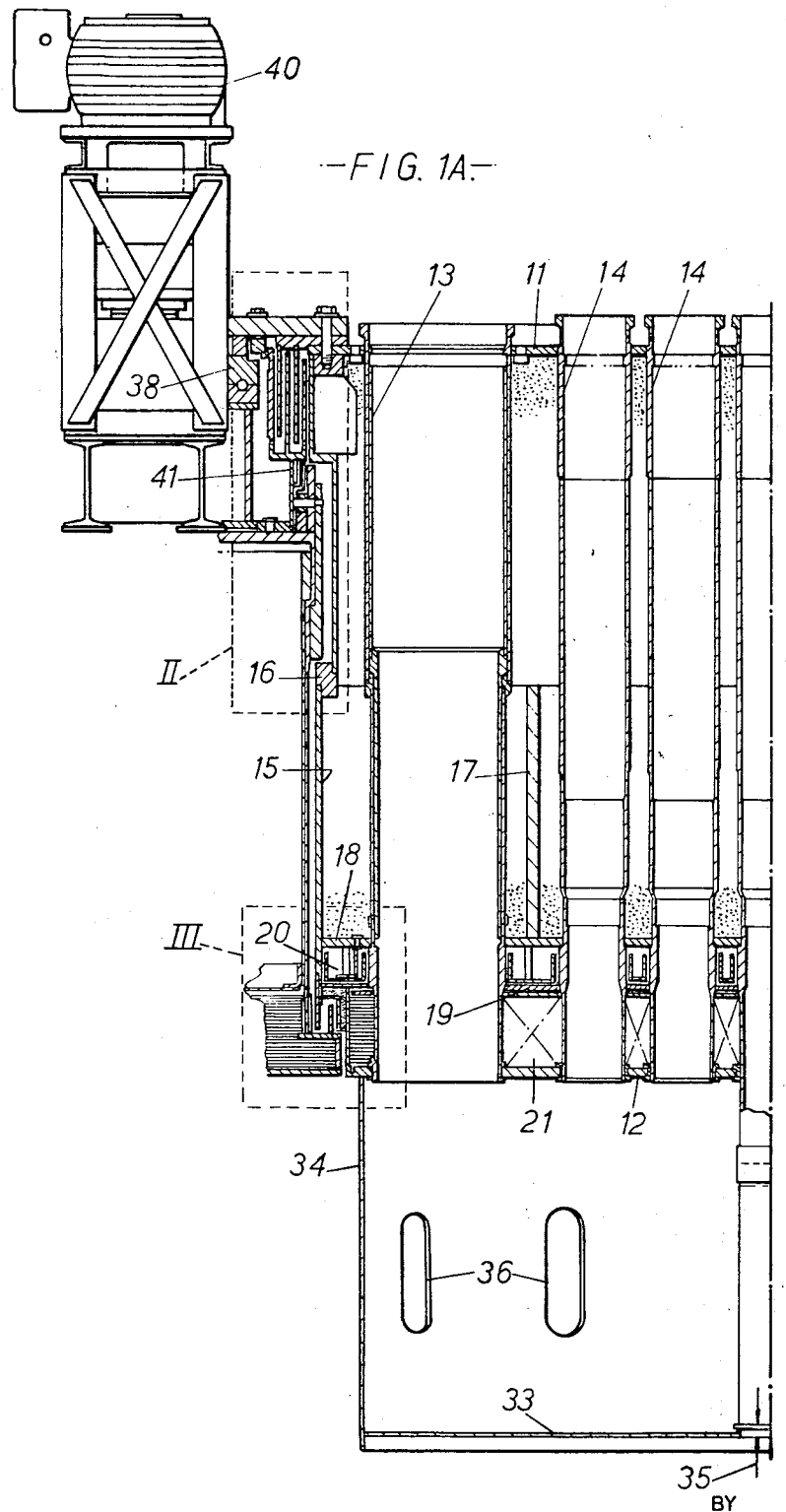

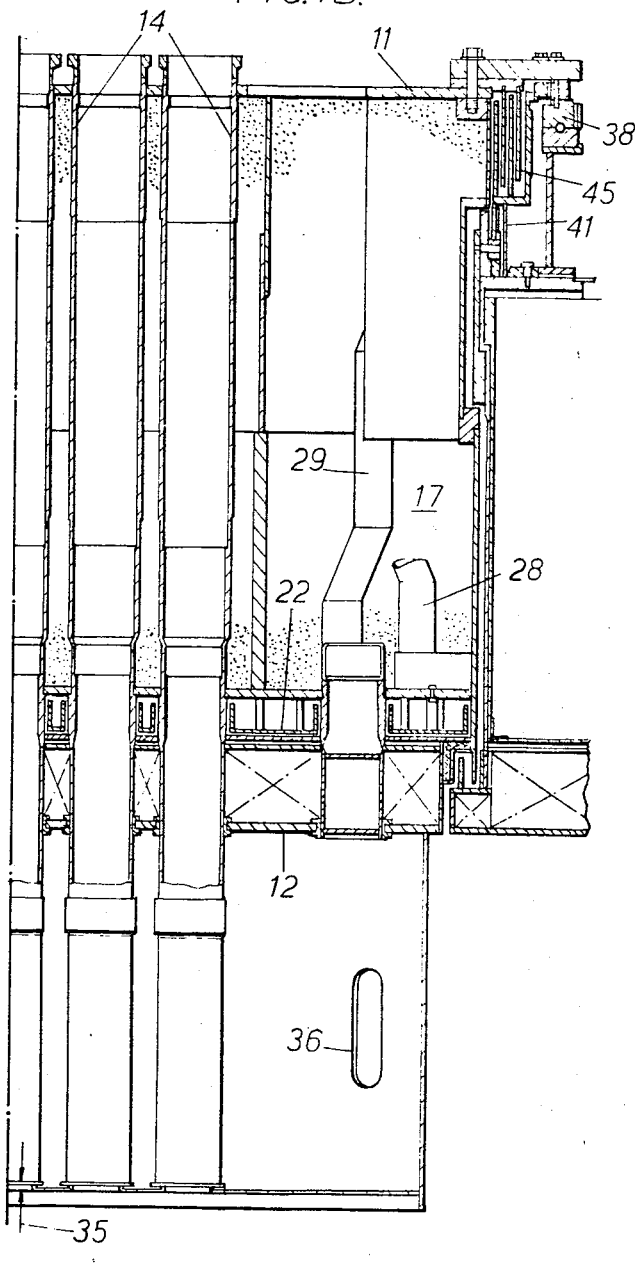

J. WEBB ET AL 3,522,144

NUCLEAR REACTOR WITH MEANS FOR SEALING
REACTOR VESSEL CLOSURE PLUG

Filed Jan. 25, 1968

United States Patent Office 3,522,144
Patented July 28, 1970

3,522,144
NUCLEAR REACTOR WITH MEANS FOR SEALING REACTOR VESSEL CLOSURE PLUG
John Webb, Bryn, near Wigan, and John Stacey, Bolton, England, assignors to United Kingdom Atomic Energy Authority, London, England
Filed Jan. 25, 1968, Ser. No. 700,520
Claims priority, application Great Britain, Feb. 24, 1967, 9,006/67
Int. Cl. G21c *13/06*
U.S. Cl. 176—50    9 Claims

ABSTRACT OF THE DISCLOSURE

A closure plug for a nuclear reactor vessel has a dip seal adjacent its outer face and a supplementary dip seal adjacent its inner face, the latter having an annular trough for containing the liquid thereof, and the trough being thermally insulated for ensuring that in normal operation said liquid is at a temperature less than that of the inner closure plug surface which is exposed to the contents of said vessel. An example involving a sodium-cooled fast reactor and having a mercury outer face dip seal and a sodium inner face dip seal is described.

---

Figure 2:
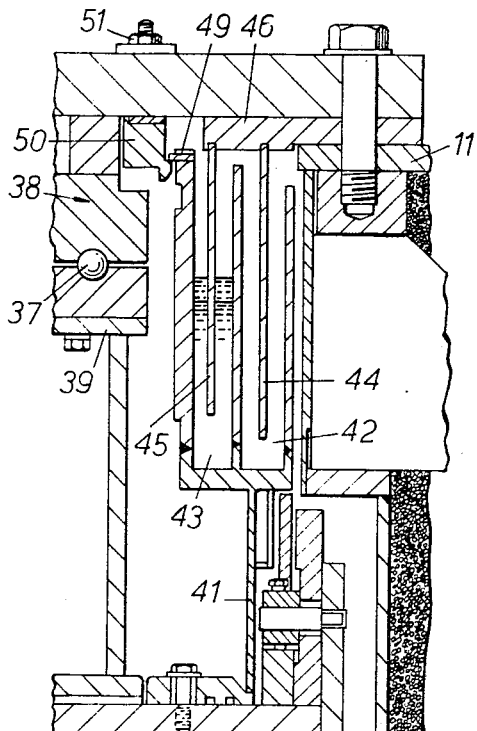

The present invention relates to nuclear reactors and more specifically is concerned with closure plugs for closing nuclear reactor vessels. Such a plug may be adapted for rotation in order that a refuelling facility carried eccentrically by the plug may service various positions. In a case such as this the inner face of the closure plug may be expected to become exposed in service to high levels of temperature and ionising radiation. Consequently the plug incorporates both thermal and radiation shielding in order that the temperature and radiation may be reduced to acceptable levels at the outer face. The plug therefore has considerable depth. Coupled with this, the plug cannot be a perfect fit and so there has to be some clearance, preferably narrow to preserve radiation shielding integrity. If deposits can collect in the clearance annulus they are liable to interfere with free rotation of the plug.

According to the invention a closure plug for a nuclear reactor vessel has, adjacent the inner face of the closure plug, a dip seal supplementary to another dip seal adjacent the outer face, and an annular trough for containing the liquid of the inner face dip seal is thermally insulated to ensure that the liquid temperature is less than that of the surface of the inner face which is exposed to the contents of said vessel, under normal operating conditions. Such an inner face dip seal acts as a barrier against entry into the clearance annulus of condensible vapours from the interior of the reactor vessel; by being kept cooler than other parts of its surroundings, its own vapour production is reduced.

It would be preferable to have, for the inner face dip seal, a liquid which has the highest possible boiling point consistent with a freezing point which can ensure that the liquid phase prevails whenever freedom to rotate the plug is required. Another criterion is that these properties should not be unacceptably altered by prolonged exposure to the sort of atmosphere prevailing inside the reactor vessel. In a liquid cooled reactor, this last criterion favours for the inner face dip seal the same liquid as is used for the coolant.

In reactors using liquid metal as coolant, a rotatable closure plug is a common feature, although it may be named differently according to design. For a design (typical of liquid metal cooled fast reactors) in which the reactor core and core coolant circuit, including heat exchangers, are submerged in a reservoir of the coolant contained in a large tank, the closure plug forms a large part of the tank roof and is often referred to as the "top shield." If one considers the case where the coolant is sodium, which is the currently preferred choice from among the low melting point alkali metals and their alloys, a use of the same liquid for the inner face dip seal would result in this liquid being sodium. The relatively low specific gravity of sodium is not well suited for dip seal applications because small pressure changes can vary the levels so greatly. In this respect the importance of the outer face dip seal becomes evident. In this outer face dip seal it becomes possible to use more suitable dip seal liquids, such as mercury, with very much reduced risk, by virtue of the inner face dip seal, of contamination by coolant vapours.

Especially with a mercury outer face dip seal two further precautions may be added: firstly, a layer of a lower specific gravity organic liquid, such as liquid paraffin, may be floated at least on the inner of the two levels formed by the sealing liquid of the outer face dip seal: secondly, a bleed of cool inert gas, such as argon, may be introduced into the clearance annulus of the closure plug to build up a pressure which will unbalance the inner face dip seal to the extent of allowing the gas to bubble through at slow rate into the reactor vessel interior. The bleed supply can be much less than if an equivalent facility were to be used to try and sweep the clearance annulus with gas in the absence of the inner face dip seal. In effect this inner dip seal imposes in these circumstances a constriction in the clearance annulus which can only be achieved satisfactorily with the mobility of a liquid.

At 98° C., the melting point of pure sodium does not fully accord with the desire for low freezing point in the sealing liquid of the inner face dip seal. However this is probably a drawback only for commissioning the reactor because at all times subsequently it is likely that a somewhat higher temperature will prevail. For starting from cold in the commissioning of the reactor, the sealing liquid may be a sodium/potassium mixture, preferably the eutectic, in order to ensure that the liquid phase pertains. A change to pure sodium can be made subsequently, if desired.

The invention will be further described with reference to the accompanying drawings in which is illustrated, by way of example, one specific embodiment of the various aspects of the invention in the top shield of a fast nuclear reactor of the submerged type previously referred to.

Figure 3:
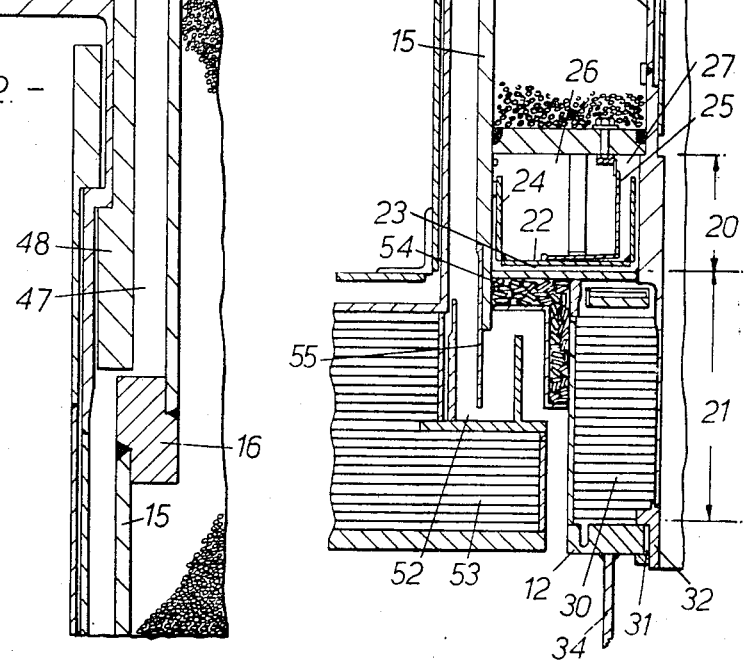

In the drawings:

FIGS. 1A and 1B are the two vertically halved parts of a view in cross section showing general features of the construction of the top shield, FIG. 2 is an enlarged view of the area enclosed by the broken line indicated II in FIG. 1A, and FIG. 3 is an enlarged view of the area enclosed by the broken line indicated III in FIG. 1A.

As seen in FIGS. 1A and 1B, the top shield is in the shape of a plug almost as deep as its diameter. It is penetrated from top to bottom by a variety of penetrations, these being formed by tubes extending between appropriate apertures in top and bottom plates 11 and 12 of the shield. By way of illustration of some of these penetrations, FIG. 1A shows a charge machine penetration defined by a tube 13 and FIGS. 1A and 1B together show several control rod mechanism penetrations defined by smaller diameter tubes such as 14.

The circumferential surface of the shield is constituted for the most part by a cylindrical wall 15 formed with a step 16 for reasons to be explained subsequently. Internal reinforcement is provided by a structure of beams indicated at 17 which rest one a lower intermediate plate 18. When seen in plan view these beams form two equilateral triangles offset angularly by 60° C. to resemble a Star of David having tips at the cylindrical wall 15. In this way the beams can extend straight and unbrokenly between widely spaced points on the cylindrical wall without interfering with the particular pattern of penetrations needed in this case.

Above the intermediate plate 18, the shield serves mainly as a shield against radiation and accordingly the interior space left vacant between the tubes such as 13 and 14 is filled with a radiation shielding material. Preferably this material is such as to allow introduction by pouring. Concrete is an example, but a better choice for the shield under consideration is probably steel shot, preferably bonded to achieve some coherence against discharge in the event of a breach of the shield walls. A suitable bonding agent would be a resin, such as an epoxy resin. A resin layer may also be arranged, prior to filling, as a skin lining the internal surfaces of at least the intermediate plate 18. In an upper portion of the shield depth the radiation shielding requirements are less stringent and therefore it is preferred, for the purpose of reduction of weight, that an upper layer of the filling is of a material having a lower specific gravity than the material beneath. Dry sand might be used but is apt to be undesirably fine. Another, and possibly better choice, is an organic material, such as polyethylene, in the form of shot similar to the steel shot already mentioned.

Beneath the intermediate plate 18, the shield has the short portion of its depth (up to the inner face represented by the bottom plate 12) constructed mainly as a thermal shield. This portion is sub-divided by a partition 19 into a fluid cooling layer 20 and an insulation layer 21. In the layer 20 there is a tray 22 of relatively thin sheet metal supported a short distance above the partition 19 to form a narrow cooling fluid flow gap 23, see FIG. 3. Upstanding sides, such as 24, on the tray serve to extend this narrow gap around the penetration tubes 13, 14 and also around the inner surface of the cylindrical wall 15. The space above the tray in the fluid cooling layer 20 is divided into inlet and outlet compartments by a curtain 25 which in the longitudinal direction extends between the intermediate plate 18 and the tray 22 and in the circumferential direction extends continuously to from a ring spaced inwardly of the inner surface of the cylindrical wall 15. In FIG. 3, the inlet compartment is indicated 26 and the outlet compartment 27. Inlet and outlet ducts 28 and 29 (FIG. 1B) are connected respectively to these compartments, these ducts extending upwards through the top plate 11 for connection to a forced clow cooling circuit. A gas, such as nitrogen or argon, used for the cooling fluid is forced into the inlet compartment 26 and can only find its way to the outlet compartment by flow through the narrow gaps 23 (FIG. 3). Through these gaps the flow velocity is increased and heat transfer to the gas thereby enhanced.

The insulation layer 21 is composed of a stack of parallel spaced plates 30 (FIG. 3), the spacing between confronting faces of these plates being about half an inch. Stainless steel plates having a thickness of 1/16 inch are suitable. The separation of the plates is chosen to give a compromise between a large gap for preventing bridging of the plates by droplets of coolant condensate and a small gap for suppressing conduction by convection currents. The top two plates in the stack are sealed together at their edges to form a gas filled skin adjacent the partition 19. The gaseous medium, suitably argon, which is used for this filling is preferably at a pressure which, when the reactor is in operation, is similar to the pressure acting on the inner face of the top shield from within the reactor vessel. This may require that the gaseous medium pressure in the gas-filled skin is initially reduced to below atmospheric.

The combined effect of the layers 20, 21 is to ensure that normally the temperature of the intermediate plate 18 does not rise above 50° C. Since coolant flow through the reactor core is upwards, the inner face of the top shield represented by the bottom plate 12 may be exposed to temperatures up to or even higher than 550° C. On account of this, it will be noted, as more clearly visible in FIG. 3, that the apertures in the bottom plate 12 for the tubes 13, 14 are made oversize by an amount which will allow thermal expansion of the plate to be accommodated without distortion of the tubes; the edges of these apertures are slidable in circumferential grooves 31 formed in rings 32 (FIG. 3) which are included in the tube structure.

As illustrated in FIGS. 1A and 1B, there is attached to the inner face of the top shield an appendage for suppressing tendencies for the outlet coolant from the core to froth at the interface with blanket gas, such as argon, maintained over the coolant free surface. The appendage comprises a baffle plate 33 spanning the core and suspended by means of a cylindrical skirt 34 far enough into the reactor tank to be well beneath the coolant surface above the core outlet. Clearance 35 exists between the edges of holes in the baffle plate and the ends of extensions of the tubes 13, 14. A radial slot (not shown) is necessary in the baffle plate 33 for refuelling operations. Through the slot and the clearances some of the outlet coolant can proceed to the upper side of the baffle plate 33; from here such coolant can pass through slots 36 in the skirt 34 for onward flow with the remainder of the coolant, which is deflected across the underside of the baffle plate 33, to primary heat exchangers, also situated in the reactor tank. Extra support for the baffle plate 33 may be provided by hangers (not shown) connecting various points in the span of the baffle plate 33 to the inner face of the top shield.

The top shield is supported in an appropriate aperture in the tank roof on rolling elements 37 (FIG. 2) of a ring bearing 38 in turn supported on a flange 39 of the roof structure. An upper ring of the bearing has gear teeth (not shown) on its outer periphery for applying drive to rotate the top shield from a motor 40 (FIG. 1A).

Also forming part of the fixed roof structure is a cylindrical web 41 (see particularly FIG. 2) encircling the shield and carrying inward and outward annular troughs 42 and 43 arranged concentrically and side by side. In conjunction with liquid contained in these troughs two cylindrical blades 44 and 45 form a pair of dip seals arranged in series at the outer face of the shield, the blades being carried by a ring 46 fastened to the shield top plate 11 so that the seals close off the clearance annulus 47 between the shield wall 15 and the wall defining the roof aperture. Reverting at this point to the provision of the step 16 in the wall 15, segments 48 overhanging the step are fixed in the roof aperture during installation of the shield. These segments conveniently make up a complete ring and constitute a restraint against ejection of the shield.

The outward dip seal of the pair at the outer face of shield uses mercury as the sealing liquid. It is intended that the inward dip seal will be filled with liquid only when the liquid of the outward dip seal is being changed. Preferably there is floated over both free surfaces of the mercury a thin layer of liquid paraffin. The paraffin covering serves as a local protection against sodium vapour and condensate coming into direct contact with the mercury. The importance of such protection stems from the fact that the amalgam formed between mercury and sodium has a freezing point which is greatly increased by small amounts of sodium above that of pure mercury ($-38.9°$ C.). A large enough increase can cause the seal to become solid and so prevent the shield being rotated. Liquid paraffin is convenient for the filling of the inward dip seal when its use is restricted as mentioned above.

Supplementary equipment may be associated with the outer face dip seals as follows: A heater (not shown)

may be incorporated in the outward annular trough 43 in which the mercury is contained. Although the possibility of freezing is considered to have been virtually eliminated, it is nevertheless preferred to have facilities available to deal with all eventualities. The heater may be simply a tube laid in the bottom of the trough with connections to the exterior to enable a heating fluid to be passed through the tube. Level indicators are desirable and also drain valves. Conveniently in the case of the mercury dip seal, the drain valve provides an extra position affording straight-through access to the bottom of the mercury trough so that solid matter which might collect like a sediment can be dislodged with a rod or similar tool.

The blanket gas maintained inside the reactor tank above the coolant free surface is at a pressure not differing greatly from atmospheric and therefore the sealing liquids are retained in the outer face dip seals whilst the reactor is operating. Provision is made, however, for establishing a mechanical seal on the atmosphere side of the outward dip seal in a manner which does not entail special positioning of the top shield. A ring 49 of resilient sealing material, such as an artificial rubber like neoprene, is fixed to the upper edge of the outward annular trough 43 to provide an overhanging lip, and a metal ring 50 is adjustable by means of stud screws, such as 51, to enable a sealing surface on the ring 50 to be moved into and out of sealing engagement with the lip. When the shield is to be rotated, it will be necessary to slacken off the stud screws to free the rings 49, 50 from one another.

Adjacent the inner face of the top shield there is a further dip seal closing off entry to the clearance annulus from the reactor tank interior. An annular trough 52 (FIG. 3) for this dip seal is carried by the tank roof but is incorporated in the continuation across the roof, as indicated at 53, of the insulation layer 21 at the inner face of the top shield. The roof insulation 53 is constructed of spaced plates in the same way as the layer 21 and extra insulation 54 is added in the angle of a step formed around the inner face of the shield to accommodate the trough 52. Projecting downwardly from this step is a cylindrical blade 55 to form the dip seal in conjunction with liquid contained in the trough. The position of the trough in relation to the insulation is arranged to give a liquid temperature in the range 200–300° C. when the reactor is operating at full load. As shown in FIG. 3 the insulation 54 uses randomly arranged metal rings, such as Raschig rings, rather than parallel plates.

The sealing liquid of the inner face dip seal is sodium or an alloy thereof with potassium to lower the freezing point. Initially at least the eutectic of sodium and potassium is used. The low specific gravity of such liquids together with the shallowness of the seal means that only small pressure differences will allow a bubbling through the seal to occur. This pressure difference may be artificially imposed in the sense causing a flow to proceed across the seal in a direction towards the reactor tank interior rather than in the opposite direction towards the clearance annulus. For this purpose, means (not shown) may be provided to bleed an inert gas, preferably that used for the blanket gas in the tank, e.g. argon, into the clearance annulus to develop therein the requisite pressure for bubbling gently through the inner face dip seal into the tank.

A further optional feature applicable to dip seals in general but more especially to those employing mercury as the sealing liquid consists in the concept of adding to the sealing liquid a substance which by comparison has a lower specific gravity than that of the sealing liquid and also has a freezing point which is higher than that of the sealing liquid to the extent of being above the normal ambient dip seal temperature in service, and which in the liquid phase is immiscible with the sealing liquid. A suitable substance for adding to mercury in a dip seal as aforesaid is one which is principally a paraffin wax. A heater is necessary in the dip seal to bring this substance into the liquid phase. When the heater is off, the substance freezes into a solid layer over the sealing liquid and then can act in the manner of a mechanical seal towards preventing expulsion of the sealing liquid in the event of a pressure surge. Preferably the interior of the trough for the liquid is convergent in an upward direction (progressively or abruptly) and is filled to ensure that some degree of convergence lies at or above the location of the frozen layer. In this way dislodgment of the layer is positively obstructed. Typical examples of substances which are principally paraffin wax are the commercially available foundryman's waxes known as Castylene A71 and Castylene B97 marketed by Campbell Technical Waxes Limited of Dartford, Kent, England. Both these waxes proved to be compatible with sodium and mercury over the appropriate temperature range (20–100° C.), had appropriate melting ranges and fluidity, and had sufficient shear strength to function as mechanical seals as aforesaid.

We claim:

1. For a nuclear reactor vessel, a closure plug having a dip seal adjacent the outer face thereof, a supplementary dip seal adjacent the inner face thereof, and a thermally insulated annular trough for the liquid of said supplementary dip seal for ensuring that the temperature of said liquid is less than that of the surface of the inner face of said plug which is exposed to the contents of said vessel, under normal operating conditions.

2. A closure plug according to claim 1, wherein the nuclear reactor is liquid cooled, and the liquid of said supplementary dip seal is the same as that employed as the reactor coolant.

3. A sodium-cooled nuclear reactor comprising a tank containing a reservoir of sodium in which the reactor core and coolant circuit, including heat exchangers, are submerged, a closure plug in the form of a rotatable shield closing the upper end of said tank, a dip seal adjacent the outer face of said plug and employing mercury as its liquid, and a supplementary dip seal adjacent the inner face of said plug and employing as its liquid a substance which at least includes sodium.

4. A nuclear reactor according to claim 3, wherein the liquid of the outer face dip seal includes, floated on said mercury, a layer of an organic liquid having a lower specific gravity than mercury.

5. A nuclear reactor according to claim 4, wherein said organic liquid is liquid paraffin.

6. A nuclear reactor according to claim 3, wherein the mercury of the outer face dip seal has above said mercury a substance which has a lower specific gravity than that of mercury, a freezing point higher than that of mercury and higher than the ambient temperature of the dip seal during normal operation, and when liquid is immiscible with mercury, and removable means for heating the liquid of said dip seal is provided for keeping said substance in the liquid phase during normal operation, removal of said heating causing said substance to freeze and thereby to provide a mechanical seal against a pressure surge from said tank.

7. A nuclear reactor according to claim 6, including walls of a trough for the liquid of said outer face dip seal which are convergent in the upward direction for obstructing dislodgement of said substance when frozen.

8. A nuclear reactor according to claim 7, wherein said substance is principally a paraffin wax.

9. A nuclear reactor according to claim 3, including means for bleeding cool inert gas into the clearance annulus between said closure plug and its surroundings so that a pressure sufficient to unbalance the inner face dip seal but not the outer face dip seal is built up in said annulus for causing said gas to bubble through the liquid of said inner face dip seal into the interior of said tank.

References Cited

UNITED STATES PATENTS

| | | | |
|---|---|---|---|
| 643,230 | 2/1900 | Moller | 220—45 |
| 2,991,905 | 7/1961 | Monson et al. | 176—87 |
| 3,362,567 | 1/1968 | Rudock | 176—87 |

CARL D. QUARFORTH, Primary

H. E. BEHREND, Assistant Examiner

U.S. Cl. X.R.

176—87; 220—45